United States Patent
Depenbrock

(10) Patent No.: US 6,316,905 B1
(45) Date of Patent: Nov. 13, 2001

(54) MEANS AND DEVICE FOR DETERMINING THE ANGULAR VELOCITY OF A ROTOR OF POLYPHASE MACHINE OPERATED BY FIELD ORIENTATION WITHOUT A TRANSMITTER

(75) Inventor: Manfred Depenbrock, Bochum (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/355,589
(22) PCT Filed: Jan. 19, 1998
(86) PCT No.: PCT/DE98/00158
§ 371 Date: Feb. 3, 2000
§ 102(e) Date: Feb. 3, 2000
(87) PCT Pub. No.: WO98/34337
PCT Pub. Date: Aug. 6, 1998

(30) Foreign Application Priority Data

Jan. 29, 1997 (DE) .............................. 197 03 248

(51) Int. Cl.$^7$ .................................................. H02P 21/00
(52) U.S. Cl. ........................... 318/801; 318/722; 318/800
(58) Field of Search ........................... 318/700, 720–724, 318/799–802

(56) References Cited

U.S. PATENT DOCUMENTS

| 5,811,957 | * | 9/1998 | Bose et al. ........................... 318/802 |
| 5,834,918 | * | 11/1998 | Taylor et al. ........................ 318/601 |
| 5,903,129 | * | 5/1999 | Okune ................................. 318/721 |

FOREIGN PATENT DOCUMENTS

| 44 33 551 | 3/1996 | (DE) . |
| 195 31 771 | 3/1997 | (DE) . |

OTHER PUBLICATIONS

Baader, et al., "Direct Self Control (DSC) of Inverter–Fed Induction Machine: A Basis for Speed Control Without Speed Measurement", May 1, 1992, IEEE Transactions on Industry Applications, vol. 28, Nr. 3, p. 581–588*.

Maischak, et al., "Schnelle Drehmomentregelung Im Gesamten Drehzahlbereich Eines Hochausgenutzten Drehfeldantriebs (Fast Torque Control in the Whole Speed Range of an Extremely Utilized Three–Phase A.C. Drive)", Archiv Fuer Elektrotechnik, Bd. 77, 1994, 289–301*.

* cited by examiner

Primary Examiner—Bentsu Ro
(74) Attorney, Agent, or Firm—Young & Thompson

(57) ABSTRACT

A method and a device are described for determining an angular velocity of the rotor of a polyphase machine operated by field orientation without a transmitter, wherein control signals, a stator current model space vector and a conjugated complex reference space vector are calculated by a signal processor containing, among other things, a complete machine model and a modulator, as a function of a flux setpoint, a torque setpoint, a d.c. voltage value, measured power converter output voltage values and system parameters, with a real stator current space vector which is measured and the calculated stator current model space vector are being multiplied by the calculated conjugated complex reference space vector, and the imaginary components of the results being compared with one another, and the system deviation determined therefrom being used to adjust the angular velocity of the rotor as a system parameter in such a way that the system deviation thus determined becomes zero. In this method, the stator current model space vector and the real stator current space vector are each processed in angular position and modulus as a function of the operating point before these processed space vectors are transformed into the complex reference system. Thus, the operational dependence of the relationship between the rotational speed difference and the system is greatly reduced.

44 Claims, 8 Drawing Sheets

MEANS AND DEVICE FOR DETERMINING THE ANGULAR VELOCITY OF A ROTOR OF POLYPHASE MACHINE OPERATED BY FIELD ORIENTATION WITHOUT A TRANSMITTER

FIELD OF THE INVENTION

The present invention relates to a method of determining the angular velocity of a polyphase machine operated by field orientation without a transmitter and a device for carrying out this method.

BACKGROUND INFORMATION

German Patent Application No. 195 31 771.8 describes a method and a device for determining an angular velocity of a polyphase machine operated by field orientation without a transmitter.

The present invention is based on the finding that under steady-state operating conditions, there is a difference $$\Delta\omega/\omega_* = \hat{\omega}/\omega_* - \omega/\omega_* = \Delta\hat{n} = \hat{n} - n \quad (1)$$

between a normalized rotational speed $\hat{n}$ of the model of the machine and a normalized speed $n$ of the polyphase machine.

According to German Patent Application No. 195 31 771.8, in steady-state operation, the following formal relationship exists between normalized rotational speed difference $\Delta\hat{n}$ and system deviation $\Delta\bot$ at the input of the equalizing controller according to the older German patent application:

$$\Delta\tilde{\bot} = \hat{\tilde{u}} \cdot (-\Delta\tilde{n}) \text{ with } \hat{\tilde{u}} = f(\hat{n}_s, \hat{n}_r, \hat{\sigma}, \hat{\rho}, \hat{\underline{T}}^*) \quad (2)$$

where

| | |
|---|---|
| $\hat{n}_r$ | is the model rotor frequency |
| $\hat{n}_s$ | is the model stator frequency |
| $\hat{\sigma} = \hat{L}_\sigma / (\hat{L}_\mu + \hat{L}_\sigma)$ | is the leakage factor of the polyphase machine |
| $\hat{\rho} = \hat{T}_r / \hat{T}_s = (\hat{L}_\mu + \hat{L}_\sigma) \cdot \hat{R}_s / (\hat{R}_r \cdot \hat{L}_\mu)$ | is the time constant ratio |
| $\hat{\underline{T}}$ | is the selected reference space vector |

The "~" symbols above notations in the equation indicate that only steady-state operating states are taken into account.

According to equation 2, the magnitude of steady-state transfer factor $\tilde{\tilde{u}}$ in general changes considerably as a function of stator frequency $\hat{n}_s$ and rotor frequency $\hat{n}_r$ as operating parameters, which characterize a steady-state operating point of the polyphase machine. FIG. 3 illustrates this relationship for the case when normalized rotor flux space vector $\hat{\psi}_r$ is selected as reference space vector $$\hat{\underline{T}}$$

for splitting the stator current model space vector and the stator current real space vector. Stator frequency $\hat{n}_s$ and rotor frequency $\hat{n}_r$ as operating parameters are linked together via normalized rotational speed n according to the following equation:

$$\hat{n}_s = \hat{n} + \hat{n}_r$$

Normalization to rotor break-down circular frequency $\omega_{rK} = R_r/L_{\sigma4}$ and the symbol "–" for characterization of steady-state operation are described in the article "Schnelle Drehmomentregelung im gesamten Drehzahlbereich eines hochausgenutzten Drehfeldantriebs" (Fast torque control in the entire rpm range of a highly utilized rotational field drives), printed in the German journal *Archiv für Elektrotechnik* (Archive for Electrical Engineering), 1994, volume 77, pages 289 through 301.

SUMMARY

An object of the present invention is to improve upon the conventional method and device in such a way as to greatly reduce the interfering dependence of the steady-state transfer factor on the rotor frequency as an operating parameter.

Due to the fact that the conjugated complex normalized rotor flux space vector divided by the square of its modulus is provided as the conjugated complex reference space vector, and the stator current model space vector and the stator current real space vector are each processed in regard to angular position and modulus as a function of the operating point before these processed space vectors are transformed into the complex reference system, this achieves the result that the interfering dependence of the steady-state transfer factor on the rotor frequency as an operating parameter is greatly reduced.

In an advantageous method, the model and real stator current space vectors are each normalized, and a differential current space vector is formed from these normalized space vectors, and then is processed as explained above and transformed. This greatly reduces the dependence of the steady-state transfer factor on rotor frequency as an operating parameter and greatly reduces the complexity.

These two methods can be optimized by calculating a complex factor which depends on the rotor frequency as an operating parameter and a leakage factor and/or a time constant ratio as a system parameter.

In another advantageous method, a time integral value of the differential current space vector is formed and is then processed and added to the processed differential current space vector. This achieves the result that the steady-state transfer factor has a constant value of one. Thus, this steady-state transfer factor no longer depends on rotor frequency as an operating parameter and the leakage factor and/or the time constant ratio as a system parameter.

By varying the calculation of the complex factors for processing the differential current space vector and its time integral value, this method can be improved with regard to its dynamic response without altering the steady-state transfer factor.

In another advantageous method, a time derivation of the differential current space vector is formed, and the sum of the processed differential current integral space vector and the processed differential current space vector is added up, and then the sum space vector thus formed is transformed. This further improves the response characteristic in the dynamic operating state.

In one example embodiment of the present invention, a device for calculating complex factors for processing the stator current model space vector, the stator current real space vector, a differential current space vector and a differential current integral space vector is connected downstream from the signal processor, with several multipliers being provided, connected to this device at the input end and at the other end to the elements at whose outputs the signals to be processed are available.

In comparison with the conventional device, an advantageous device additionally has only the device for calculating the complex factors, a comparator device and two additional multipliers. These additional elements may be integrated into the signal processor in an especially advantageous device. In other words, the difference between the device according to the present invention and the conventional device lies in the software rather than the hardware.

DETAILED DESCRIPTION

Figure 1:
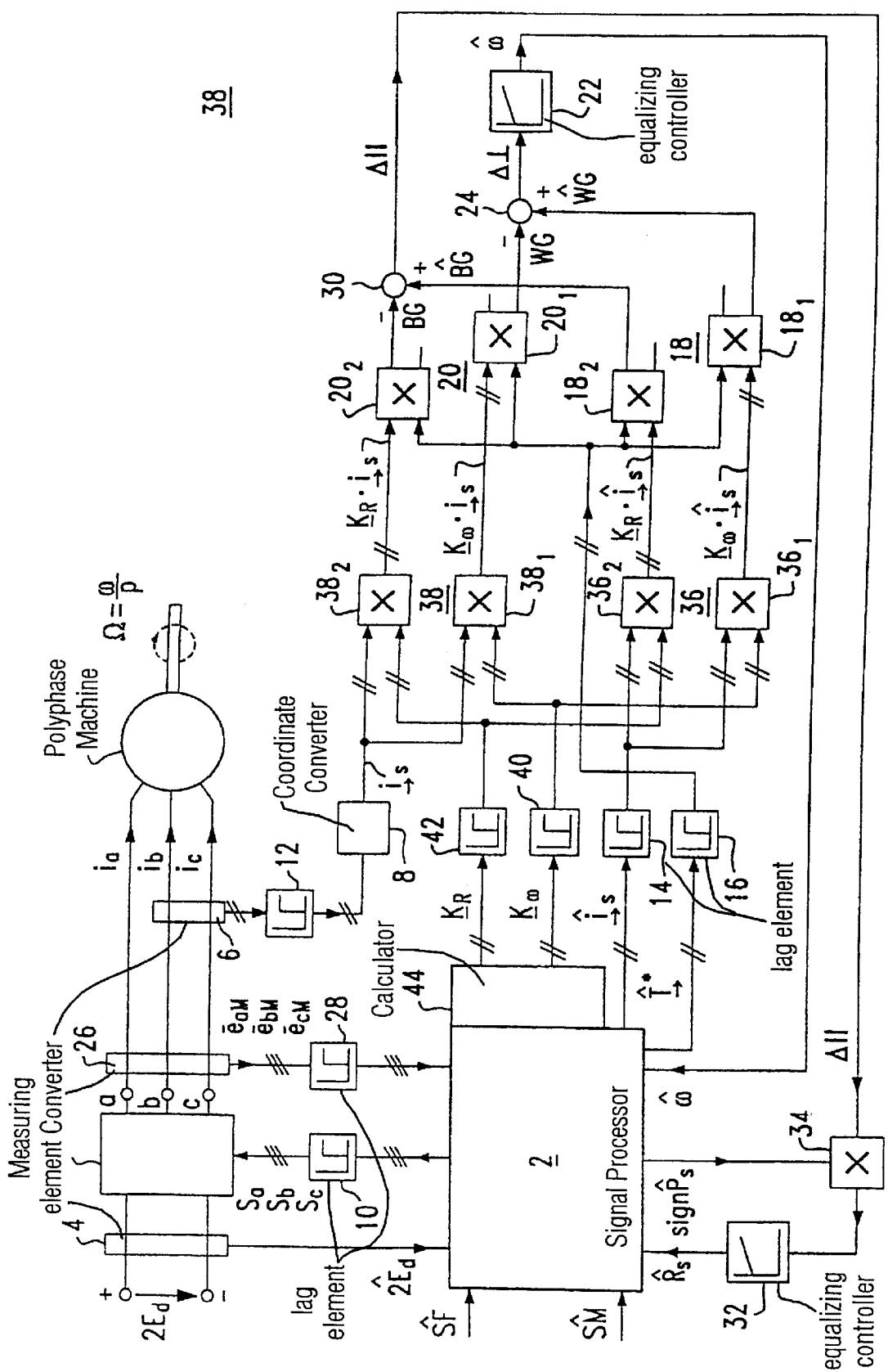
FIG. 1 shows a block diagram of a first embodiment of the device for carrying out the method according to the present invention.

FIG. 1 shows a block diagram of a first embodiment of the device for carrying out the method according to the present invention. Portions of this device are described in German Patent Application No. 195 31 771.8. This conventional portion includes polyphase machine DM which receives power from a pulse power converter SR. A d.c. voltage $2E_d$, also referred to as an d.c. link voltage, is applied at the input end of pulse power converter SR. Pulse power converter SR receives control signals $S_a$, $S_b$, $S_c$ from a signal processor 2. In addition, the conventional portion of this device includes measuring elements 4, 6, 26, lag elements 10, 12, 14, 16, 28, a coordinate converter 8, a first and a second multiplier 18, 20, two comparators 24, 30, two equalizing controllers 22, 32 and a multiplier 34. Signal processor 2, which also includes a complete machine model and a modulator, is linked at the output end to pulse power converter SR by way of lag element 10, to an input of first multiplier 18 by way of a lag element 14, and to another input of the first and second multipliers 18, 20 by way of lag element 16. Coordinate converter 8 is connected at the input to measuring element 6 via lag element 12 and at the output to another input of second multiplier 20. At the input, signal processor 2 is connected directly to measuring element 4 and it is connected to measuring element 26 by way of lag element 28. In addition, signal processor 2 is connected at the input to equalizing controllers 22, 32, with equalizing controller 22 being connected directly to the output of comparator 24 and equalizing controller 32 being connected to the output of comparator 30 by way of multiplier 34. Furthermore, two setpoints ŜM and ŜF are supplied to signal processor 2. The outputs of these two multipliers 18, 20 at which imaginary components WG,ŴĜ are available are connected to the inputs of comparator 24, and the outputs of these two multipliers 18, 20, where real components BG,B̂Ĝ are available, are connected to the inputs of comparator 30. System deviation $\Delta\perp$ is available at the output of comparator 24 for adaptation of rotor angular velocity $\hat{\omega}$ as a system parameter, and system deviation $\Delta\|$ is available at the output of comparator 30 for adaptation of stator resistance $\hat{R}_s$ as a system parameter.

German Patent Application 195 31 771.8 discussed above describes the mode of operation of this conventional device in detail, so that no description is necessary here.

According to the present invention, this conventional device is expanded, as described below.

In an example embodiment of the present invention, the first and second multipliers 18, 20 are subdivided into partial multipliers $18_1$, $18_2$, $20_1$, $20_2$, one output of partial multipliers $18_1$, $20_1$, being connected to the inputs of comparator 24 and one output of partial multipliers $18_2$, $20_2$ being connected to the inputs of comparator 30. Two additional multipliers 36, 38, subdivided into partial multipliers $36_1$, $36_2$ and $38_1$, $38_2$, are arranged between these first and second multipliers $18_1$, $18_1$, $20_1$, $20_2$ and lag element 14 on the one hand, and coordinate converter 8, on the other. The outputs of partial multipliers $36_1$, $36_2$ and $38_1$, $38_2$ are each connected to one input of partial multipliers $18_1$, $18_2$ and $20_1$, $20_2$. The additional inputs of these partial multipliers $18_1$, $18_2$, $20_1$, $20_2$ are each connected to the output of lag element 16 at whose input conjugated complex reference space vector $$\underline{\hat{t}}^*$$

is applied. The first inputs of partial multipliers $36_1$, $36_2$ and $38_1$, $38_2$ are each connected to lag element 14 and coordinate converter 8, whereas the second inputs of these partial multipliers $36_1$, $38_1$ and $36_2$, $38_2$ are connected via a lag element 40 or 42 to a device 44 for calculating complex factors $\underline{K}_\omega$, $\underline{K}_R$. A processed stator current model space vector $$K_\omega \cdot \underline{\hat{i}}_s, K_R \cdot \underline{\hat{i}}_s$$

and a processed stator current real space vector $$K_\omega \cdot \underline{i}_s, K_R \cdot \underline{i}_s$$

are available at the outputs of partial multipliers $36_1$, $36_2$ and $38_1$, $38_2$ and are then transformed by conjugated complex reference space vector $$\underline{\hat{t}}^*$$

and partial multipliers $18_1$, $18_2$, $20_1$, $20_2$ into the complex reference system. The angular position and modulus of stator current model space vector and stator current real space vector $$\underset{\rightarrow}{i_s}$$

are changed by multiplication by complex factors $\underline{K}_\omega$, $\underline{K}_R$ as a function of operating point.

In the following embodiments according to FIGS. 2 and 5 through 8, normalized variables are used. These variables are obtained by dividing by a corresponding reference quantity. The following reference quantities are used:

| | |
|---|---|
| $\Psi_*$ | Reference quantity for flux variables, defined as the modulus of the sapce vector of the stator flux linkage in operation at nominal flux |
| $I_* = \Psi_*/L_\sigma$ | Reference quantity for currents |
| $\omega_* = \omega_\sigma = R_r/L_\sigma$ | Reference quantity for circular frequencies and angular velocities |
| $T_* = T_\sigma = L_\sigma/R_r = \dfrac{1}{\omega_{rK}}$ | Reference quantity for time |

These reference quantities are characterized by the index * with the respective symbol. The following symbols and letters have been chosen for normalized variables:

$\Psi/\Psi_* = \psi$ $i/I_* = y$ $\omega/\omega_* = n$ $t/T_* = \tau$

Figure 2:
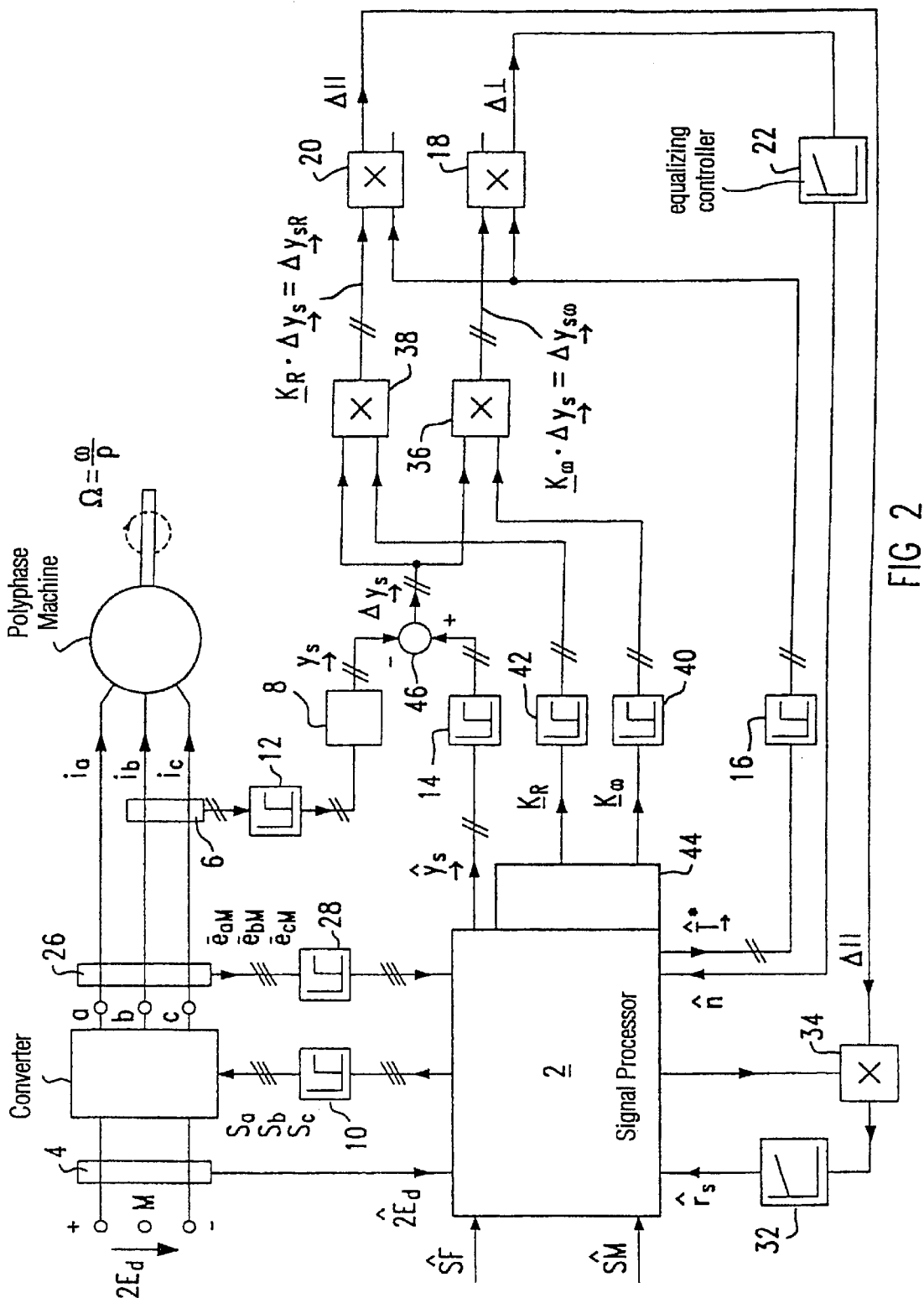
FIG. 2 shows a block diagram of a second embodiment of the device for carrying out the method according to the present invention.

FIG. 2 shows a second embodiment of the device for carrying out the method according to the present invention. This second embodiment is especially advantageous, because it is less complicated and less expensive than the first embodiment according to FIG. 1. In this second embodiment, the output of coordinate converter 8 and the output of lag element 14 are connected to the inputs of a comparator device 46, whose output is connected to one input each of multipliers 36, 38. From the pending normalized stator current model space vector $$\underset{\rightarrow}{\hat{y}_s}$$

and the normalized stator current real space vector $$\underset{\rightarrow}{y_s},$$

this comparator device 46 forms a normalized differential current space vector $$\Delta \underset{\rightarrow}{y_s}$$

which is processed further.

This space vector $$\Delta \underset{\rightarrow}{y_s}$$

of the differences between the model currents and the machine currents is determined by taking into account the shift in time between the measured values and the previously calculated model values in the $v^{th}$ calculation cycle according to the following equation:

$$\Delta \underset{\rightarrow}{y_s}(v) = \underset{\rightarrow}{\hat{y}_s}(v - T_\Sigma/T_C) - \underset{\rightarrow}{y_s}(v) \qquad (3)$$

The resulting time shift $T_\Sigma$ is taken into account by lag element 14 in FIG. 2.

In comparison with the embodiment according to FIG. 1, multipliers 18, 20, 36, 38 are not subdivided into two partial multipliers here. The second input of multiplier 36 is connected to the output of lag element 40 whose input receives complex factor $\underline{K}_\omega$. The second input of multiplier 38 is connected to the output of lag element 42 whose input receives complex factor $\underline{K}_R$. A processed, normalized differential current space vector $$\Delta \underset{\rightarrow}{y_{s\omega}} \text{ and } \Delta \underset{\rightarrow}{y_{sR}}$$

is available at the output of multiplier 36 and 38, respectively, and is transformed to the complex reference system by conjugated complex reference space vector $$\underset{\rightarrow}{\hat{f}^*}$$

and multiplier 18 or 20.

The imaginary component of the product formed by multiplier 18 is sent as system deviation $\Delta\perp$ to equalizing controller 22 for adaptation of normalized rotational speed $\hat{n}$, with the real component of the product formed by multiplier 20 being sent as a system deviation $\Delta\|$ to equalizing controller 32 by way of multiplier 34 for adaptation of stator resistance $\hat{r}_s$. Instead of the sign of the stator power, the sign 'sign $(\hat{n}_r \cdot \hat{n}_s)$' of the product of model rotor frequency $\hat{n}_r$ and stator frequency $\hat{n}_s$ is sent from signal processor 2 to multiplier 34.

Figure 3:
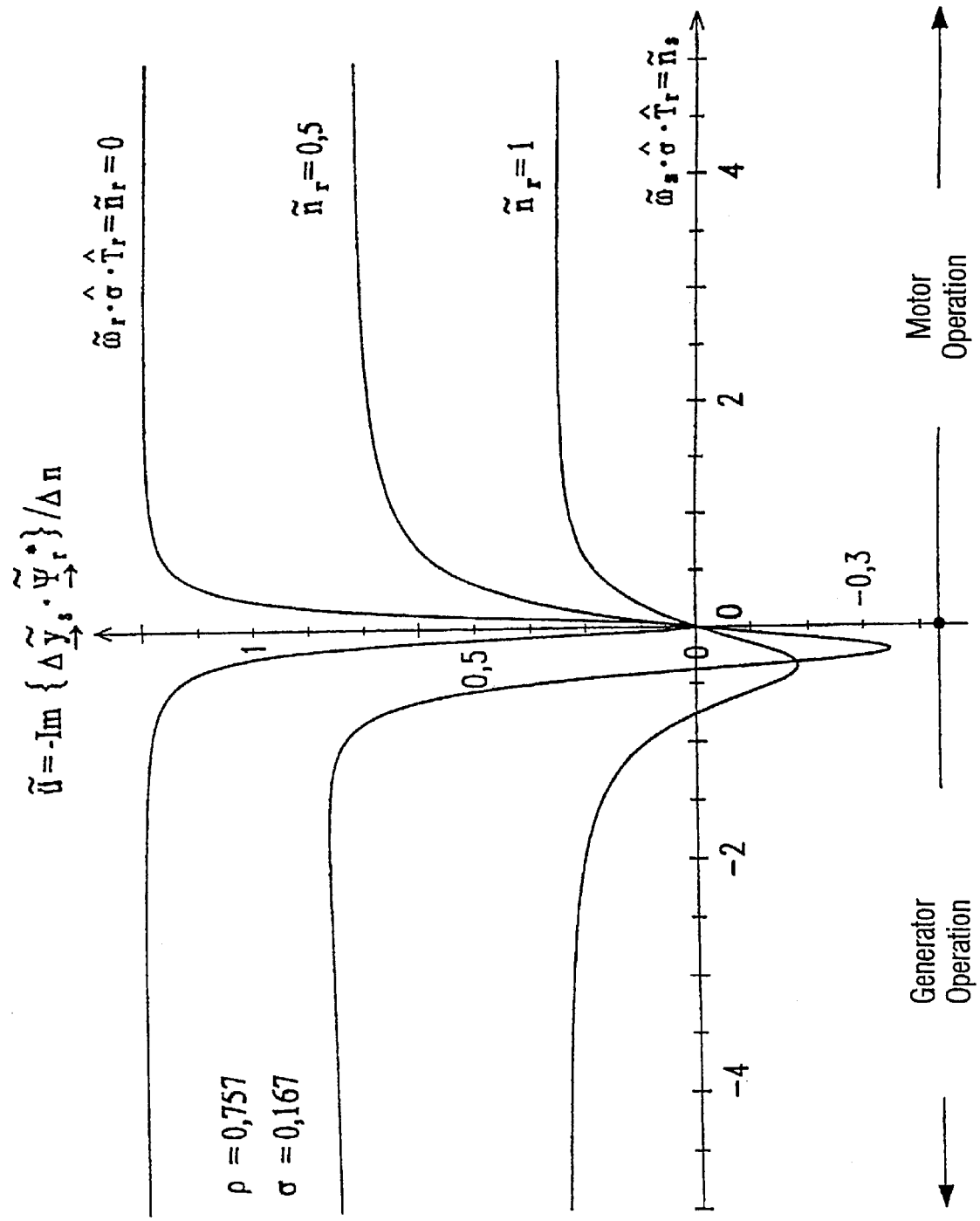
FIG. 3 shows a diagram illustrating the steady-state transfer factor plotted over the stator frequency as a function of the rotor frequency without the use of the method according to the present invention.

FIG. 3 shows a diagram of steady-state transfer factor $\tilde{u}$ plotted over stator frequency $\tilde{n}_s$ as a function of rotor frequency $\tilde{n}_r$. This diagram is obtained if normalized conjugated complex rotor flux space vector $$\underset{\rightarrow r}{\psi^*}$$

is selected as when conjugated
as conjugated complex reference space vector $$\underset{\rightarrow}{\hat{f}^*}$$

in the second embodiment according to FIG. 2, and a constant value of one is assumed for complex factor $\underline{K}\omega$ for processing differential current space vector $\Delta \underset{\rightarrow}{y_s}.$ As this diagram shows, steady-state transfer factor $\tilde{u}$ in motor operation and generator operation depends to a great extent on rotor frequency $\tilde{n}_r$ as an operating parameter, and this transfer factor $\tilde{u}$ changes signs in generator operation at a low stator frequency $\tilde{n}_s$. Rotor frequency $\tilde{n}_r$ and stator frequency $\tilde{n}_s$ are operating parameters calculated according to the equations:

$$\tilde{n}_r = \omega_r \cdot \hat{\sigma} \cdot \hat{T}_r \qquad (4)$$

$$\tilde{n}_s = \omega_s \cdot \hat{\sigma} \cdot \hat{T}_r \qquad (5)$$

Figure 4:
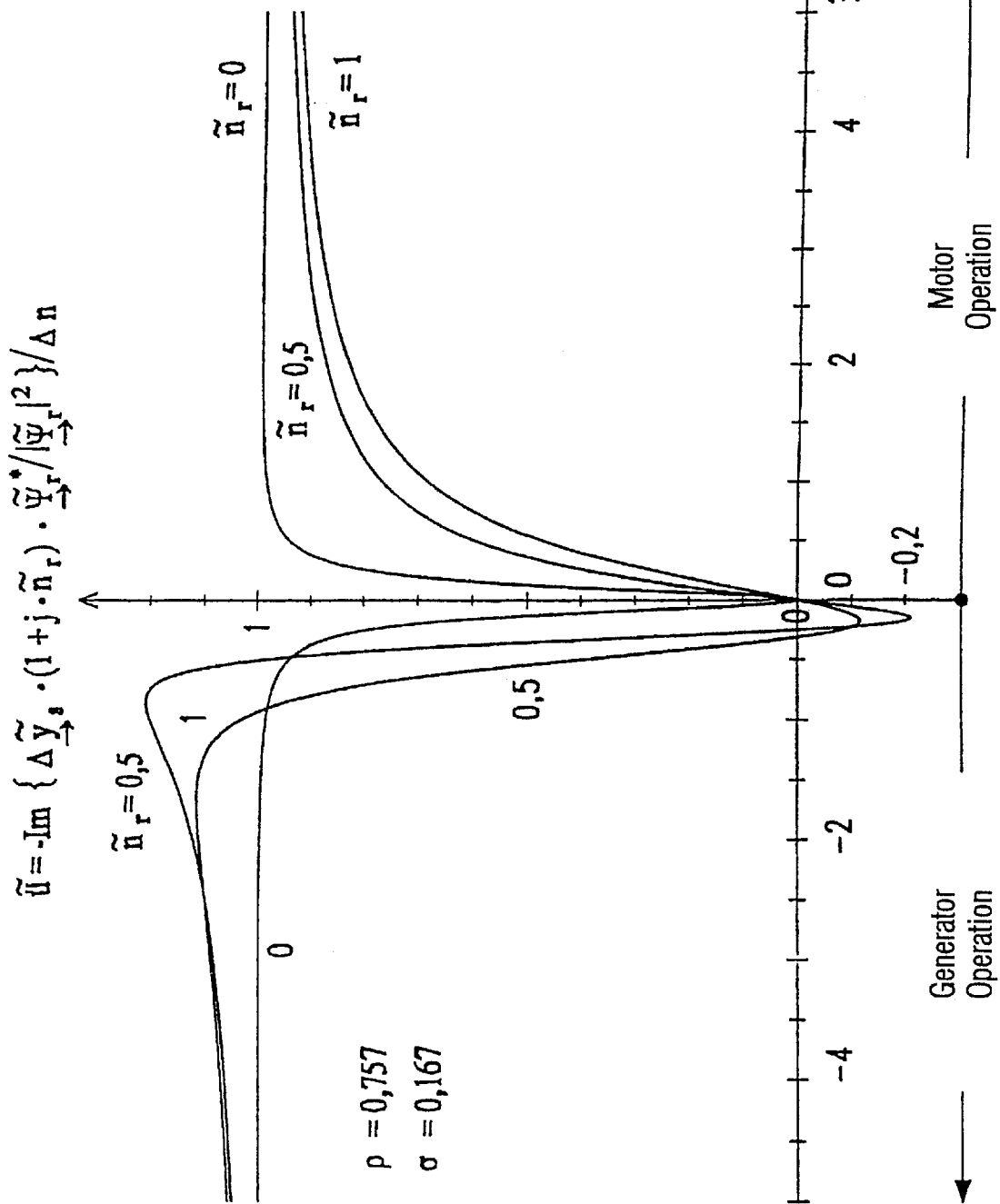
FIG. 4 shows a diagram illustrating the steady-state transfer factor plotted over the stator frequency as a function of the rotor frequency when using the method according to the present invention.

FIG. 4 shows a diagram of steady-state transfer factor $\tilde{u}$ plotted over stator frequency $\tilde{n}_s$ as a function of rotor frequency $\tilde{n}_r$. This diagram is obtained when complex factor $\underline{K}\omega$ according to the equation:

$$\underline{K}_\omega = 1 + j \cdot \hat{n}_r \qquad (6)$$

is selected by device 44 for calculating complex factors $\underline{K}_\omega$, $\underline{K}_R$ and conjugated complex reference space vector $$\underset{\rightarrow}{\hat{T}^*}$$

according to the following equation:

$$\underset{\rightarrow}{\hat{T}^*} = \underset{\rightarrow}{\hat{\Psi}_r^*} / |\underset{\rightarrow}{\hat{\Psi}_r}|^2 \qquad (7)$$

is selected.

Thus, system deviation $\Delta\perp$ for adaptation of normalized rotational speed $\hat{n}$ of the complete machine model of signal processor 2 according to the embodiment of the device as in FIG. 2 is formed according to the equation:

$$\Delta \perp = \operatorname{Im}\left\{ \Delta \underset{\rightarrow}{y_s} \cdot (1 + j \cdot \hat{n}_r) \cdot \underset{\rightarrow}{\hat{\Psi}_r^*} / |\underset{\rightarrow}{\hat{\Psi}_r}|^2 \right\} \qquad (8)$$

Due to the processing of differential current space vector $$\Delta \underset{\rightarrow}{y_s}$$

using complex factor $\underline{K}_\omega$ according to equation (6), the dependence of steady-state transfer factor $\tilde{u}$ on rotor frequency $\tilde{n}_r$ as an operating parameter is greatly reduced, as shown by the diagram according to FIG. 4. However, this diagram shows that this steady-state transfer factor $\tilde{u}$ still changes signs in generator operation at a low stator frequency $\tilde{n}_s$.

At such operating points, rotational speed difference $\Delta n$ cannot be regulated to zero in a stable manner using a simple PI controller in the form of an equalizing controller 22. To overcome this disadvantage, in another example of the method in the operating range in question, complex factor $\underline{K}_\omega$ is calculated in device 44 according to the following equation:

$$\underline{K}_\omega = 1 + j \cdot \hat{n}_r / \hat{\sigma} \qquad (9)$$

System deviation $\Delta\perp$ is then determined according to the following equation:

$$\Delta \perp = \operatorname{Im}\left\{ \Delta \underset{\rightarrow}{y_s} \cdot (1 + j \cdot \hat{n}_r / \hat{\sigma}) \cdot \underset{\rightarrow}{\hat{\Psi}_r^*} / |\underset{\rightarrow}{\hat{\Psi}_r}|^2 \right\} \qquad (10)$$

Steady-state transfer factor $\tilde{u}$ then always has a positive sign for any desired combination of operating parameters $\hat{n}_s$ and $\hat{n}_r$, although the characteristic curves in FIG. 4 are tangents to the zero line at $\hat{n}_s = 0$, i.e., system deviation $\Delta\perp$ has a very low sensitivity in reacting to a rotational speed difference $\Delta n$. In another example of this method, this disadvantage can be overcome if complex factor $\underline{K}\omega$ is determined in device 44 according to the following equation:

$$\underline{K}_\omega = 1 + j \cdot \hat{n}_r \cdot (2/\hat{\sigma} - 1) \qquad (11)$$

System deviation $\Delta\perp$ is then obtained according to the following equation:

$$\Delta \perp = \operatorname{Im}\left\{ \Delta \underset{\rightarrow}{y_s} \cdot [1 + j \cdot \hat{n}_r \cdot (2/\hat{\sigma} - 1)] \cdot \underset{\rightarrow}{\hat{\Psi}_r^*} / |\underset{\rightarrow}{\hat{\Psi}_r}|^2 \right\} \qquad (12)$$

However, in motor operation at a low stator frequency, this variant yields negative values for steady-state transfer factor $\tilde{u}$. For this reason, complex factor $\underline{K}\omega$ is always calculated according to equation (6) in device 44 in motor operation, i.e., when the product of stator frequency $\hat{n}_s$ and rotor frequency $\hat{n}_r$ as operating parameters is positive. The same thing is true if the sign of the product of stator frequency $\hat{n}_s$ and rotor frequency $\hat{n}_r$ as operating parameters is negative, but the absolute value of stator frequency $\hat{n}_s$ as an operating parameter is above a limit $|\hat{n}_{sE}|$. On the whole, these instructions for using equation (6) can be implemented by binary logic processing of the following relationship:

$$\hat{n}_s \cdot \hat{n}_r > 0$$

or $$|\hat{n}_s| > |\hat{n}_{sE}|$$

where $$\hat{n}_{sE} = -V \cdot \hat{\rho} \cdot \hat{n}_r \qquad (13)$$

where $V > 1$, e.g., $V = 1.3$.

Complex factor $\underline{K}\omega$ is calculated according to equation (9) or (11) by using device 44 in conjunction with signal processor 2 only in the operating range with the following characterization:

$$\hat{n}_s \cdot \hat{n}_r < 0 \text{ and } 0 < |\hat{n}_s| < |\hat{n}_{sA}|$$

where $$\hat{n}_{sA} = \frac{1}{Q \cdot V} \cdot \frac{1 - \hat{\sigma}}{1 + \hat{n}_r^2} \cdot \hat{n}_{sE} \qquad (14)$$

where $Q > 1$, e.g., $Q = 2$ when complex factor $\underline{K}_\omega$ is calculated according to equation (9), and $Q = 4$ when this complex factor $\underline{K}_\omega$ is calculated according to equation (11).

In the remaining range with values of $\hat{n}_s$ between $\hat{n}_{sE}$ and $\hat{n}_{sA}$, which is also referred to as the cross-fade range, a soft cross-fade is performed from equation (6) to equation (9) or to equation (11) to calculate factor $\underline{K}\omega$. To do so, an auxiliary variable $X^2$ which is always positive is used; it is determined according to the following equation:

$$X^2 = \frac{(\hat{n}_{sE} - \hat{n}_s)^2}{(\hat{n}_{sE} - \hat{n}_{sA})^2} \quad (15)$$

in device 44 in combination with signal processor 2.

In this cross-fade range, complex factor $\underline{K}_\omega$ is then determined in device 44 according to the following instructions. In cross-fade between equation (6) and equation (9), the instruction is:

$$\underline{K}\omega = 1 + j \cdot \hat{n}_r \cdot [1 + x^2 \cdot (1 - \hat{\sigma})/\hat{\sigma}] \quad (16)$$

and in cross-fade between equation (6) and equation (11), the instruction for calculating complex factor $\underline{K}_\omega$ is then:

$$\underline{K}\omega = 1 + j \cdot \hat{n}_r \cdot [1 + x^2 \cdot 2 \cdot (1 - \hat{\sigma})/\hat{\sigma}] \quad (17)$$

Figure 5:
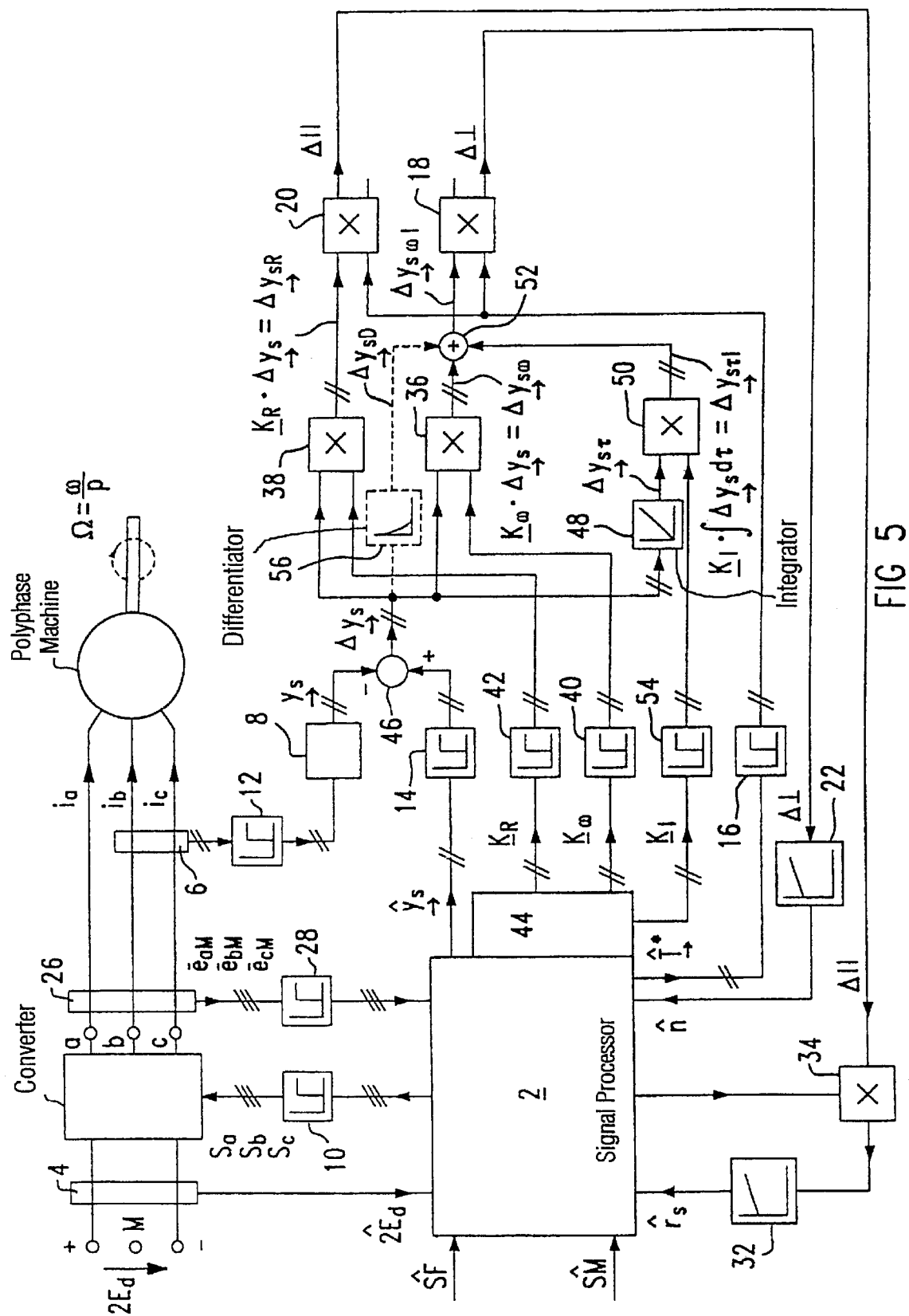
FIG. 5 shows a block diagram of another example embodiment of the present invention.

FIG. 5 shows a block diagram of another embodiment of the device for carrying out the method according to the present invention, with this embodiment based on the embodiment according to FIG. 2. This embodiment of the device differs from the embodiment of the device according to FIG. 2 in that the output of comparator device 46 is connected to an input of an integrator 48, which is connected at its output to an adder 52 by way of an additional multiplier 50. A second input of the additional multiplier 50 is connected to one output of an additional lag element 54, which is connected at its input to device 44. The second input of adder 52 is connected to the output of multiplier 36, with this adder 52 being connected at the output to an input of first multiplier 18. A complex factor $\underline{K}_I$ is available at the input of second lag element 54; time integral value $$\underset{\rightarrow}{\Delta y_{sT}},$$

which is also known as differential current integral space vector $$\underset{\rightarrow}{\Delta y_{sT}},$$

of differential current space vector $$\underset{\rightarrow}{\Delta y_s}$$

is processed with the help of this complex factor. This processed differential current integral space vector $$\underset{\rightarrow}{\Delta y_{sTI}}$$

is then added to the processed differential current space vector $$\underset{\rightarrow}{\Delta y_{s\omega}}$$

by adder 52. Like complex factor $\underline{K}_\omega$, complex factor $\underline{K}_I$ is determined anew by device 44 in each calculation cycle. The time shift of calculated variables and those determined by measurement is taken into account by lag element 54. Sum space vector $$\underset{\rightarrow}{\Delta y_{s\omega I}}$$

available at the output of adder 52 is multiplied by conjugated complex reference space vector $$\underset{\rightarrow}{\hat{\Psi}^*}$$

in first multiplier 18. The imaginary component of this product supplies system deviation $\Delta\bot$. Conjugated complex reference space vector $$\underset{\rightarrow}{\hat{\Psi}^*}$$

is formed unchanged according to equation (7) in signal processor 2, whereas complex factor $\underline{K}_\omega$ is calculated in device 44 according to equation (6) in combination with signal processor 2. The following equation holds for determination of additional complex factor $\underline{K}_I$:

$$\underline{K}_I = \hat{\rho} \cdot (\hat{\sigma} - j \cdot \hat{n}_r) \quad (18)$$

System deviation $\Delta\bot$ is thus obtained from the following rule:

$$\Delta\bot = \text{Im}\left\{\left(\underset{\rightarrow}{\Delta y_{s\omega}} + \underset{\rightarrow}{\Delta y_{sTI}}\right) \cdot \underset{\rightarrow r}{\hat{\Psi}^*} \bigg/ |\underset{\rightarrow r}{\hat{\Psi}}|^2\right\} \quad (19)$$

where $$\underset{\rightarrow}{\Delta y_{s\omega}} = \underline{K}_\omega \cdot \underset{\rightarrow}{\Delta y_s}$$

$$\underset{\rightarrow}{\Delta y_{sTI}} = \underline{K}_I \cdot \int \underset{\rightarrow}{\Delta y_s} \cdot d\tau$$

When system deviation $\Delta\bot$ is determined according to equation (19), then steady-state transfer factor $\tilde{u}$ has a constant value of one, i.e., it no longer depends on the operating parameters or system parameters. However, in dynamic transitions between steady-state operating points, there is still some dependence of transfer factor $\tilde{u}$ on these parameters.

If, according to another variant of the method, these two complex factors $\underline{K}_\omega$ and $\underline{K}_I$ are calculated according to the two following equations:

$$\underline{K}\omega = \hat{\rho} + 1 + j \cdot \hat{n}_r \quad (20)$$

and $$\underline{K}_I = \hat{\rho} \cdot (\hat{\sigma} - j \cdot \hat{n}) \quad (21)$$

where $$\hat{n} = \hat{\omega}/\omega^*$$

this yields an improvement in the dynamic response without any change in steady-state transfer factor $\tilde{u}$.

A further improvement in transfer response in dynamic operating states is achieved by also taking into account the time derivative of differential current space vector $$\overrightarrow{\Delta y_s}$$

in sum space vector $$\overrightarrow{\Delta y_{s\omega I}}.$$

To do so, the output of comparator device 46 is also connected to a differentiator 56, which is connected at the output to another input of adder 52. Time derivative $$\overrightarrow{\Delta y_{sD}}$$

of differential current space vector $$\overrightarrow{\Delta y_s}$$

is then available at the output of this differentiator 56 and it is added to sum space vector $$\overrightarrow{\Delta y_{s\omega I}}.$$

In this variant, complex factors $\underline{K}_\omega$ and $\underline{K}_I$ are determined in device 44 in combination with signal processor 2 according to the two following equations:

$$\underline{K}_\omega = \hat{\rho} + 1 - j \cdot \hat{n} \quad (22)$$

and $$\underline{K}_I = \hat{\rho} \cdot (\hat{\sigma} - j \cdot \hat{n}) \quad (21)$$

In comparison with the previous variant, only the rule for determination of complex factor $\underline{K}_\omega$ changes. The equation for determining system deviation $\Delta \perp$ is thus:

$$\Delta \perp = \mathrm{Im}\left\{\left[\underbrace{d\overrightarrow{\Delta y_s}\Big/d\tau}_{\overrightarrow{\Delta y_{sO}}} + \underbrace{\overrightarrow{\Delta y_s} \cdot (\hat{\rho} + 1 - j \cdot \hat{n})}_{\overrightarrow{\Delta y_{s\omega}}} + \underbrace{\left(\int \overrightarrow{\Delta y_s} \cdot d\tau\right) \cdot \hat{\rho} \cdot (\hat{\sigma} - j \cdot \hat{n})}_{\overrightarrow{\Delta y_{sTI}}}\right] \cdot \overrightarrow{\Psi}_r^* \Big/ |\overrightarrow{\Psi}_r|^2\right\} \quad (23)$$

In practice, variable $$\left|\overrightarrow{\psi_r}\right|$$

normally changes so slowly that its time derivative can be disregarded without any significant error. Then equation (23) yields value $\Delta n$ continuously, not only under steady-state operating conditions, and it holds that:

$$\Delta \perp = -\Delta n \ \overrightarrow{u} = 1 \ \overrightarrow{u} \neq f(\hat{n}_s, \hat{n}_r, \hat{\sigma}, \hat{\rho}, t) \quad (24)$$

Under steady-state operating conditions, differential current space vector $$\overrightarrow{\Delta y_s}$$

rotates at angular velocity $\hat{\omega}_s$ which can reach very high values, e.g., $200 \cdot 2\pi$ to $300 \cdot 2\pi$ Hz. The orthogonal coordinates of time derivative $$\overrightarrow{\Delta y_{sD}}$$

of differential current space vector $$\overrightarrow{\Delta y_s}$$

which are formed by differentiator 56 according to FIG. 5 are periodic quantities with angular frequency $\hat{\omega}_s$. Then, it is difficult to adequately filter out the interfering signals which are superimposed on the useful signal and originate from the measurement chain for determination of the normalized stator current real space vector $$\overrightarrow{y_s}.$$

Figure 6:
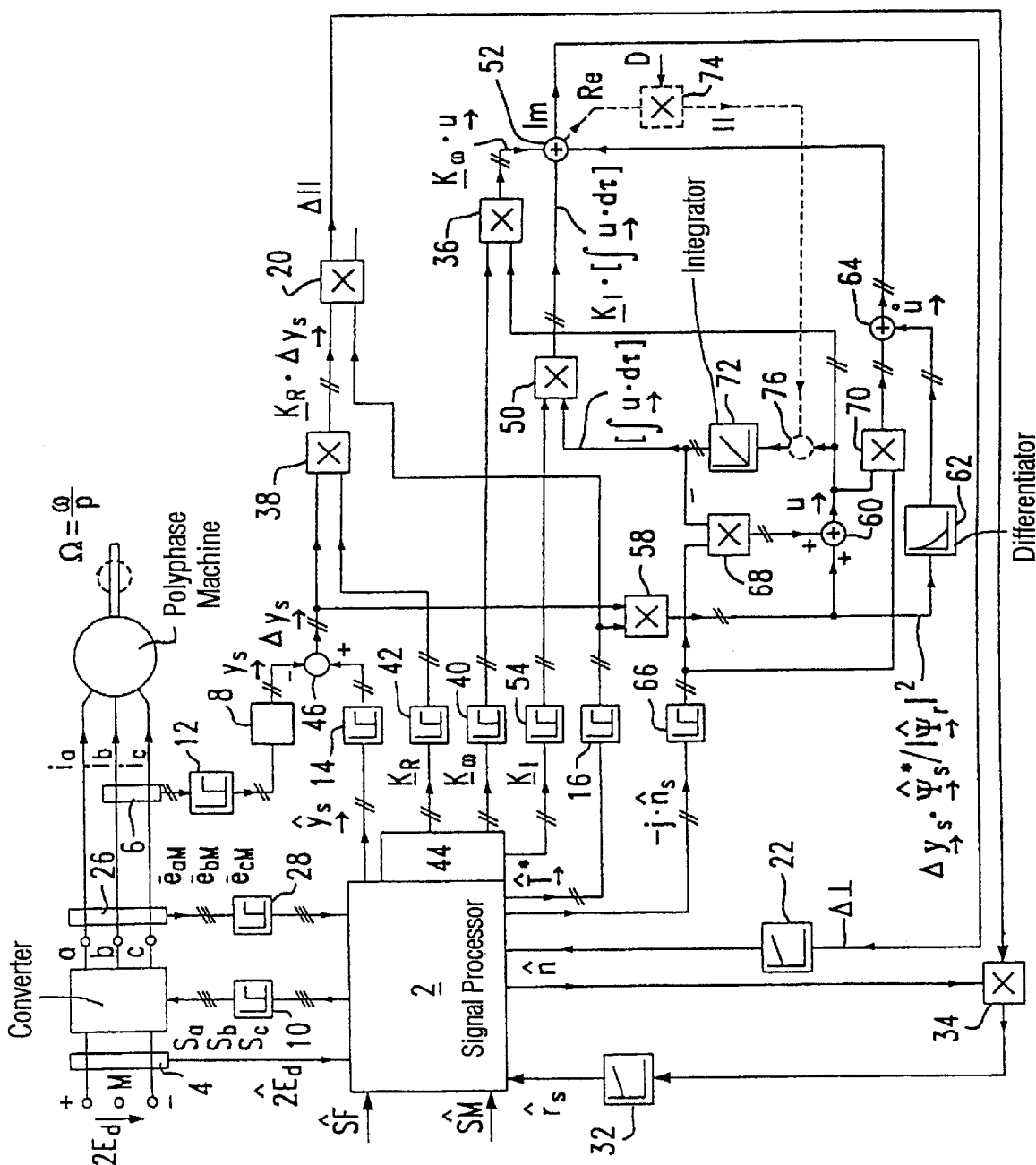
FIG. 6 shows a block diagram of yet another example embodiment of the present invention.

This disadvantage can be reduced significantly by another embodiment of the device according to FIG. 6. To achieve this, three new quantities, which are formed by the following equations, are also needed:

$$\left[\int \overrightarrow{u} \cdot d\tau\right] \approx \left\{\int \overrightarrow{\Delta y_s} \cdot d\tau\right\} \cdot \overrightarrow{\Psi}_r^* \Big/ |\overrightarrow{\Psi}_r|^2 \quad (25)$$

$$\overrightarrow{u} = \left(\overrightarrow{\Delta y_s} \cdot \overrightarrow{\Psi}_r^* \Big/ |\overrightarrow{\Psi}_r|^2\right) - j \cdot \hat{n}_s \cdot \left[\int \overrightarrow{u} \cdot d\tau\right] \quad (26)$$

$$\overset{\circ}{\overrightarrow{u}} = d\left(\overrightarrow{\Delta y_s} \cdot \overrightarrow{\Psi}_r^* \Big/ |\overrightarrow{\Psi}_r|^2\right)\Big/d\tau - j \cdot \hat{n}_s \cdot \overrightarrow{u} \quad (27)$$

Under steady-state conditions, the quantities determined with equations (25) and (26) are then constant over time, and the quantity determined by equation (27) has a value of zero. The noise interference superimposed on the useful signals can now be attenuated comparatively easily to a sufficient extent by low-pass filtering.

FIG. 6 shows a block diagram of another embodiment of the device for carrying out the method according to the present invention, using the quantities determined by equations (25), (26) and (27). In this embodiment, the output of comparator device 46 is connected to an additional multiplier 58 instead of multiplier 36; the second input of this additional multiplier is connected to the output of lag element 16, at whose input conjugated complex reference space vector $$\overrightarrow{\hat{T}^*}$$

is available.

The output of this multiplier 58 is connected first to an additional adder 60 and second to an additional differentiator 62, which is connected at the output to an input of an additional adder 64. Signal processor 2, which generates conjugated complex reference space vector $\hat{T}^*$,
$\rightarrow$ also calculates the negative imaginary stator frequency—$j \cdot \hat{n}_s$. This stator frequency $-j \cdot \hat{n}_s$ goes over a lag element 66 to an additional multiplier 68 and 70. The output of multiplier 68 is connected to the second input of second adder 60, whose output is connected first to an additional integrator 72 and second to multiplier 70. The output of this integrator 72 is connected first to multiplier 68 and second to multiplier 50 at whose second input the complex factor $\underline{K}_I$ is available, which is delayed by lag element 54. The output of multiplier 70 is connected to a second input of additional adder 64 by whose output supplies quantity $$\overset{\circ}{\underset{\rightarrow}{u}} \cdot \text{Quantity } \underset{\rightarrow}{u}$$

which is determined according to equation (26) is available at the output of additional adder 60, and the quantity determined according to equation (25) is available at the output of additional integrator 72. The outputs of multipliers 36 and 50 and the output of additional adder 64 are linked together by adder 52. The imaginary component of this output quantity then forms system deviation $\Delta\perp$ which is sent to equalizing controller 22.

In this embodiment, complex factors $\underline{K}_\omega$ and $K_I$ are determined in device 44 according to the following rules:

$$\underline{K}_\omega = \hat{\rho} + 1 + j \cdot (\hat{n}_s + \hat{n}_r) \tag{28}$$

$$\underline{K}_I = \hat{\rho} \cdot \hat{\sigma} \cdot \hat{n}_r + j \cdot (\hat{n}_s + \hat{\rho} \cdot \hat{n}_r) = Z \tag{29}$$

The resulting equation for determining system deviation $\Delta\perp$ is then:

$$\Delta\perp = \text{Im}\left\{\overset{\circ}{\underset{\rightarrow}{u}} + \underset{\rightarrow}{u} \cdot [\hat{\rho} + 1 + j \cdot (\hat{n}_s + \hat{n}_r)] + \left[\int \underset{\rightarrow}{u} \cdot d\tau\right] \cdot Z\right\} \tag{30}$$

In the ideal case, real component Re at the second output of adder 52 is always equal to zero. For attenuation of residual errors that are technically unavoidable, the second scalar output signal, i.e., real component Re of the complex quantity at the output of adder 52, can be multiplied by an attenuation factor D by an additional multiplier 74. Output quantity ∥ of this additional multiplier 74 is superimposed on quantity $$\underset{\rightarrow}{u}$$

by an additional adder 76. The signal at the output of multiplier 74 formally has two identical coordinates, which is why the output signal of multiplier 74 is designated by two parallel lines. Since in the ideal case, real component Re of the output quantity of adder 52 is constantly equal to zero, this branch is represented by an interrupted line.

With regard to system deviation $\Delta\|$, which is formed from the real component of the product at the output of second multiplier 20, there is the problem that outside of the operating range with an extremely low stator frequency, the rotational speed determination by equalizing controller 22 and the stator resistance determination by equalizing controller 32 can interfere mutually with one another. In steady-state operation, the feedback effect of a rotational speed deviation An on system deviation $\Delta\|$ can be prevented according to the present invention if complex factor $\underline{K}_R$ is determined in device 44 according to the following equation:

$$\underline{K}_R = -j \cdot Z = -j[\hat{\rho} \cdot \hat{\sigma} \cdot \hat{n}_s \cdot \hat{n}_r + j(\hat{n}_s + \hat{\rho} \cdot \hat{n}_r)] \tag{31}$$

The equation for determining system deviation $\Delta\|$ is thus:

$$\Delta\| = \text{Re}\left\{-\Delta y_s \cdot j \cdot Z \cdot \underset{\rightarrow r}{\hat{\Psi}}^* / |\underset{\rightarrow r}{\hat{\Psi}}|^2\right\} \tag{32}$$

In this application of equation (32), the quantity sign $\hat{n}_r$ can be obtained from signal processor 2 as the input signal for correcting the control direction, which is sent to multiplier 34.

Figure 7:
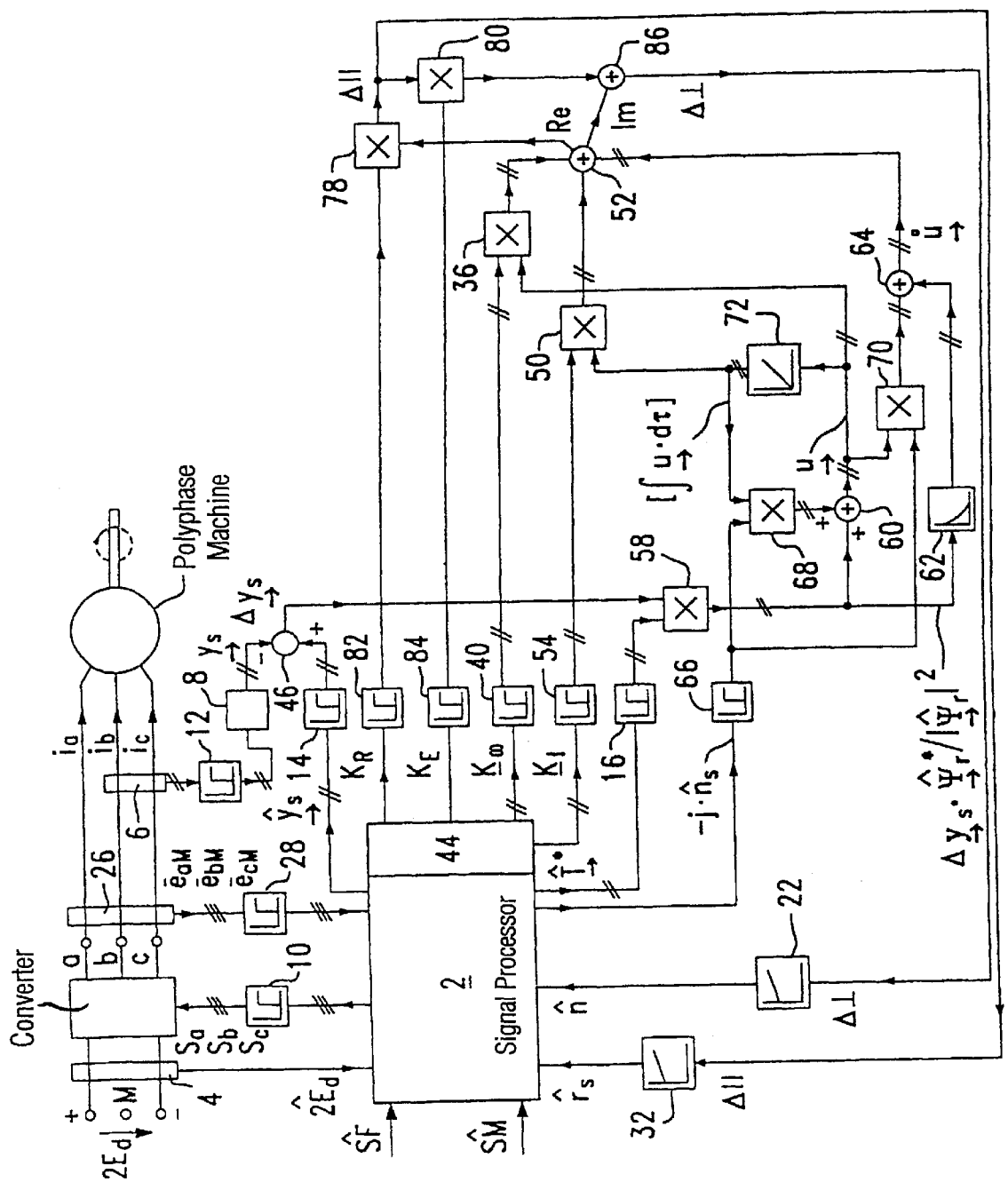
FIG. 7 shows a block diagram of a further example embodiment of the present invention.

FIG. 7 shows a block diagram of another embodiment of the device, which differs from the embodiment according to FIG. 6 in that now two additional multipliers 78, 80 and two lag elements 82, 84 are provided instead of multipliers 38, 20 and lag element 42. The output of lag element 82 is connected to a first input of multiplier 78, whose second input is connected to the second output of adder 52 at which real component Re of the complex quantity at the output of adder 52 [sic] is available. At the output, this multiplier 78 is connected first to the input of equalizing controller 32 and second to an input of multiplier 80 whose second input is connected to the output of lag element 84. At the output, this multiplier 80 is connected to an additional adder 86 at whose second input is applied imaginary component Im of the complex output quantity of adder 52. The output quantity of this adder 86 is system deviation $\Delta\perp$ for adaptation of model parameter $\hat{n}$. Lag elements 82, 84 are connected at the input to the outputs of device 44, where real factor $K_R$ and real isolation factor $K_E$ are applied. In device 44 in combination with signal processor 2, required processing factors $K_R$, $K_E$, $\underline{K}_\omega$, $\underline{K}_I$ are calculated according to the following equations:

$$K_R = \hat{n}_s \cdot ((1-\hat{\sigma})^2 / (2 \cdot \hat{\sigma} \cdot \hat{n}_r)) \tag{33}$$

$$K_E = (\hat{\sigma} - \hat{n}_r^2) / [\hat{n}_s \cdot (1-\hat{\sigma})^2] \tag{34}$$

$$\underline{K}_\omega = \hat{\rho} + 1 + j \cdot (\hat{n}_s + \hat{n}_r) \tag{35}$$

$$\underline{K}_I = Z = \hat{\rho} \cdot \hat{\sigma} \cdot \hat{n}_s \cdot \hat{n}_r + j \cdot (\hat{n}_s + \hat{\rho} \cdot \hat{n}_r) \tag{36}$$

System deviations $\Delta\perp$ and $\Delta\|$ are thus formed according to the following rules:

$$\Delta\| = \text{Re}\left\{\overset{\circ}{\underset{\rightarrow}{u}} + \underset{\rightarrow}{u} \cdot \underline{K}_\omega + \left[\int \underset{\rightarrow}{u} \cdot d\tau\right] \cdot K_I\right\} \cdot K_R \tag{37}$$

and $$\Delta\perp = \text{Im}\left\{\overset{\circ}{\underset{\rightarrow}{u}} + \underset{\rightarrow}{u} \cdot \underline{K}_\omega + \left[\int \underset{\rightarrow}{u} \cdot d\tau\right] \cdot K_I\right\} + \Delta\| \cdot K_E \tag{38}$$

With this embodiment, the corrections of system deviations $\Delta\perp$ and $\Delta\|$ can be isolated not only under steady-state conditions but also under fully dynamic conditions.

Isolation of the corrections of system deviations $\Delta\perp$ and $\Delta\|$ that is very good under steady-state conditions and is adequate under dynamic conditions is possible even without integration of quantity $$\underset{\rightarrow}{u}$$

defined by equation (26) or the quantity according to equation (25).

In this case, the equations for determination of processing factors $K_R$, $K_E$ and $\underline{K}_\omega$ are as follows:

$$K_R = \hat{n}_s \cdot (1-\hat{\sigma})^2/(2 \cdot \hat{\sigma} \cdot \hat{n}_r) \quad (33)$$

$$K_E = (\hat{\sigma} - \hat{n}_r^2)/[\hat{n}_s \cdot (1-\hat{\sigma})^2] \quad (34)$$

and $$\underline{K}_\omega = 1 + \hat{\rho} \cdot \hat{n}_r/\hat{n}_s - j \cdot [\hat{\rho} \cdot \hat{\sigma}/\hat{n}_s - \hat{n}_r] \quad (39)$$

System deviations $\Delta\perp$ and $\Delta\|$ are then formed according to the following rules:

$$\Delta\| = \mathrm{Re}\left\{\overset{\circ}{\underset{\rightarrow}{v}} + \underset{\rightarrow}{v} \cdot \underline{K}_\omega \right\} \cdot K_R \quad (40)$$

and $$\Delta\perp = \mathrm{Im}\left\{\overset{\circ}{\underset{\rightarrow}{v}} + \underset{\rightarrow}{v} \cdot \underline{K}_\omega \right\} + \Delta\| \cdot K_E \quad (41)$$

where $$\underset{\rightarrow}{v} = \left(\underset{\rightarrow}{\Delta y_s} \cdot \underset{\rightarrow r}{\hat{\Psi}^*} / |\underset{\rightarrow r}{\hat{\Psi}}|^2\right); \quad \overset{\circ}{\underset{\rightarrow}{v}} = \frac{d\underset{\rightarrow}{v}}{d\tau}$$

Figure 8:
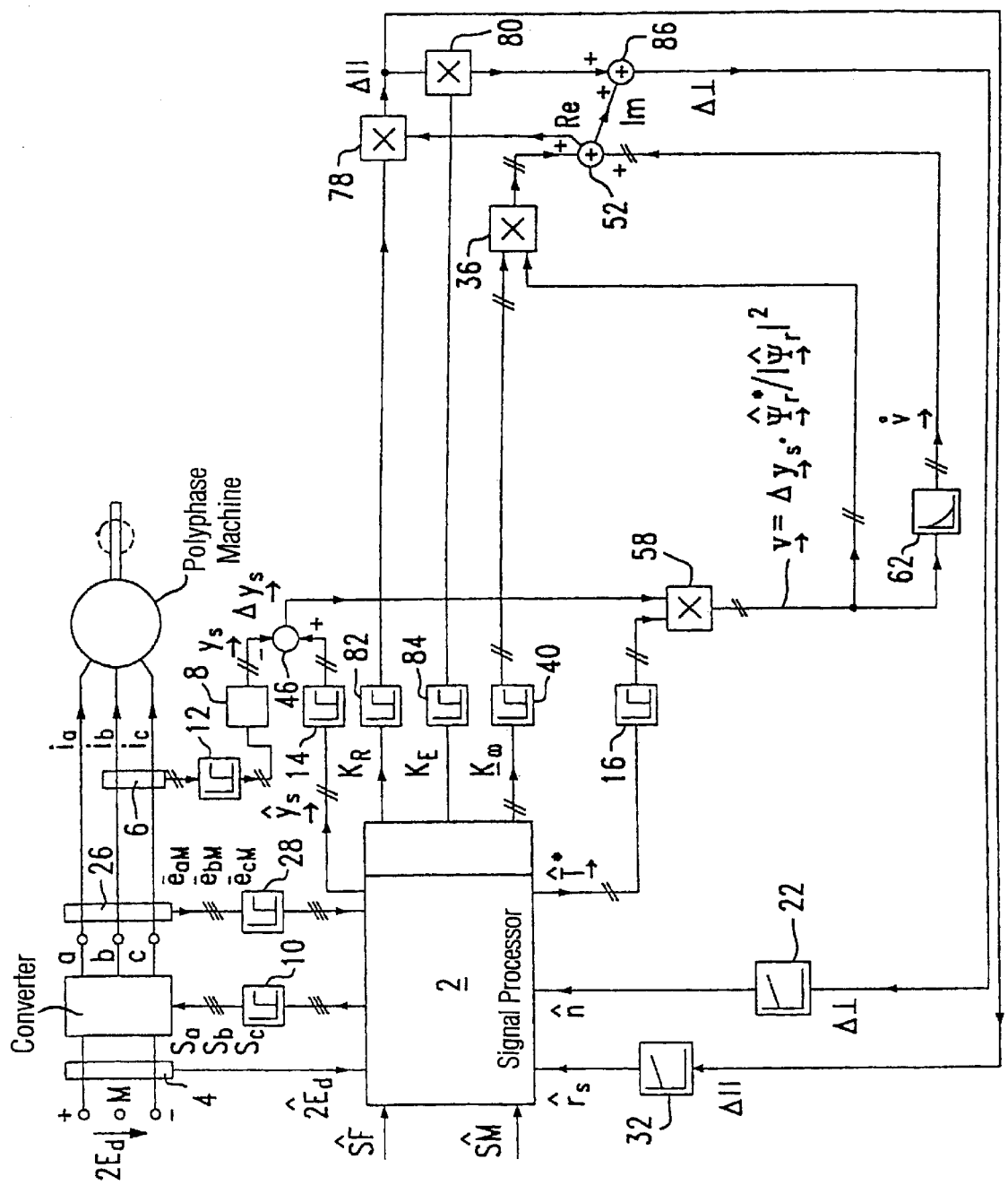
FIG. 8 shows a block diagram of yet another example embodiment of the present invention.

FIG. 8 shows a block diagram of a corresponding embodiment formed by omitting the following elements from the embodiment according to FIG. 7:

lag elements 54 and 66, multipliers 50, 68 and 70, integrator 72 and adders 60 and 64.

It should be pointed out that since the operating parameters stator frequency $\tilde{n}_s$ and rotor frequency $\hat{n}_r$ also occur as factors in the denominator of fractions in equations (33) through (41), these quantities are to be limited to minimum values before the corresponding division.

By using processing factor $\underline{K}_\omega$ for stator current model space vector $$\underset{\rightarrow}{\hat{i}_s},$$

stator current real space vector $$\underset{\rightarrow}{i_s}$$

or normalized differential current space vector $$\underset{\rightarrow}{\Delta y_s},$$

the dependence of steady-state transfer factor $\tilde{u}$ on the operating parameter rotor frequency $\tilde{n}_r$ can be greatly reduced. By using all processing factors $\underline{K}_\omega$, $\underline{K}_R$ and $K_E$, $K_R$, transfer factor $\tilde{u}$ may have a constant value of one for steady-state and dynamic operating conditions, with the corrections of system deviations $\Delta\perp$ and $\Delta\|$ also being fully isolated even under dynamic conditions.

What is claimed is:

1. A method of determining a rotor angular velocity of a polyphase machine operated by field orientation without a transmitter, comprising the steps of:

determining power converter control signals, a stator current model space vector and a conjugated complex reference space vector as a function of a flux setpoint, a d.c. voltage value applied at an input of a pulse power converter of the polyphase machine, measured power converter output voltage values, and system parameters, the conjugated complex reference space vector formed from a reference space vector, a normalized rotor flux space vector divided by a square of the normalized rotor flux space vector being provided as the reference space vector;

multiplying the stator current model space vector and a real stator current space vector by a first operating-point dependent variable complex factor;

transforming the multiplied stator current model space vector and the multiplied real stator current space vector into a field-oriented complex reference system by multiplying the multiplied current model space vector and the multiplied real stator current space vector by the conjugated complex reference space vector;

splitting the transformed current model space vector and the transformed real stator current space vector into real components and imaginary components of the complex reference system;

comparing the imaginary components with one another;

determining a system deviation as a function of the step of comparing the imaginary components; and adjusting the rotor angular velocity using the system deviation as a system parameter so that the system deviation becomes zero.

2. The method according to claim 1, further comprising the step of:

determining the first operating-point-dependent complex variable factor according to the following equation:

$$\underline{K}_\omega = 1 + j + \hat{n}_r$$

where $\underline{K}_\omega$ is the first operating-point dependent complex variable factor, and $\hat{n}_r$ is a normalized angular velocity of the normalized rotor flux space vector in a rotor-fixed reference system.

3. The method according to claim 2, further comprising the step of:

where the first operating-point-dependent complex variable factor is determined in motor operation.

4. The method according to claim 2, wherein the following relationship is met:

$$|\hat{n}_s| \geq |\hat{n}_{sE}|$$

where $$\hat{n}_{sE} = -v \cdot \hat{\rho} \cdot \hat{n}_r \text{ and } v > 1$$

with $\hat{n}_s$ being the normalized angular velocity of the normalized rotor flux space vector in a stator-fixed reference system, $\hat{n}_r$ being the normalized angular velocity of the normalized rotor flux space vector in the rotor-fixed reference system, $\hat{\rho}$ being a ratio of a rotor time constant of the polyphase machine to a stator time constant of the polyphase machine, $\hat{n}_{sE}$ being a normalized limit value of a cross-fade region, and v being a constant.

5. The method according to claim 1, further comprising the step of:

determining the first operating-point-dependent complex variable factor according to the following equation:

$$\underline{K}_\omega = 1 + j + \hat{n}_r/\hat{\sigma}$$

where $\underline{K}_\omega$ is the first operating-point dependent complex variable factor, $\hat{n}_r$ is a normalized angular velocity of the normalized rotor flux space vector in a rotor-fixed reference system, and $\hat{\sigma}$ is a leakage factor of the polyphase machine.

6. The method according to claim 5, wherein the following relationship is met:

$$\hat{n}_s \cdot \hat{n}_r < 0 \text{ and } 0 < |\hat{n}_s| < |\hat{n}_{sA}|$$

where $$\hat{n}_{sA} = \frac{1}{Q \cdot V} \cdot \frac{1-\hat{\sigma}}{1+\hat{n}_r^2} \cdot \hat{n}_{sE} \text{ and } Q > 1$$

with $\hat{n}_s$ being the normalized angular velocity of the normalized rotor flux space vector in a stator-fixed reference system, $\hat{n}_r$ being the normalized angular velocity of the normalized rotor flux space vector in the rotor-fixed reference system $\hat{n}_{sA}$ being a normalized initial limit value of a cross-face region, $\hat{\sigma}$ being a leakage vector of the polyphase machine, and $\hat{n}_{sE}$ being a normalized final limit value of a cross-face region.

7. The method according to claim 1, further comprising the step of:

determining the first operating-point-dependent complex variable factor according to the following equation:

$$\underline{K}_\omega = 1 + j + \hat{n}_r \cdot (2/\hat{\sigma} - 1)$$

where $\underline{K}_\omega$ is the first operating-point dependent complex variable factor, $\hat{n}_r$ is a normalized angular velocity of the normalized rotor flux space vector in a rotor-fixed reference system, and $\hat{\sigma}$ is a leakage factor of the polyphase machine.

8. The method according to claim 1, further comprising the step of:

determining the first operating-point-dependent complex variable factor according to the following equation:

$$\underline{K}_\omega = 1 + j \cdot \hat{n}_r \cdot [1 + X^2 \cdot (1-\hat{\sigma})/\hat{\sigma}]$$

where $$X^2 = \frac{(\hat{n}_{sE} - \hat{n}_s)^2}{(\hat{n}_{sE} - \hat{n}_{sA})^2}$$

with $\underline{K}_\omega$ being the first operating-point-dependent complex variable factor, $\hat{n}_s$ being the normalized angular velocity of the normalized rotor flux space vector in a stator-fixed reference system, $\hat{n}_r$ being the normalized angular velocity of the normalized rotor flux space vector in the rotor-fixed reference system, $\hat{n}_{sA}$ and $\hat{n}_{sE}$ being a normalized initial limit value of a cross-fade region and a normalized final limit value of the cross-fade region, and $\hat{\sigma}$ being a leakage factor of the polyphase machine.

9. The method according claim 1, further comprising the step of:

determining the first operating-point-dependent complex variable factor in a cross-fade region is calculated according to the following equation:

$$\underline{K}_\omega = 1 + j \cdot \hat{n}_r \cdot [1 + X^2 \cdot 2 \cdot (1-\hat{\sigma})/\hat{\sigma}]$$

where $$X^2 = \frac{(\hat{n}_{sE} - \hat{n}_s)^2}{(\hat{n}_{sE} - \hat{n}_{sA})^2}$$

with $\underline{K}_\omega$ being the first operating-point-dependent complex variable factor, $\hat{n}_s$ being the normalized angular velocity of the normalized rotor flux space vector in a stator-fixed reference system, $\hat{n}_r$ being a normalized angular velocity of the normalized rotor flux space vector in the rotor-fixed reference system, $\hat{n}_{sA}$, $\hat{n}_{sE}$ being a normalized initial limit value of the cross-fade region and a normalized end limit value of the cross-fade region, respectively, and $\hat{\sigma}$ being a leakage factor of the polyphase machine.

10. A method of determining a rotor angular velocity of a polyphase machine operated by field orientation without a transmitter, comprising the steps of:

determining power converter control signals, a stator current model space vector and a conjugated complex reference space vector as a function of a flux setpoint, a d.c. voltage value applied at an input of a pulse power converter of the polyphase machine, measured power converter output voltage values, and system parameters, the conjugated complex reference space vector formed from a reference space vector, a normalized rotor flux space vector divided by a square of the normalized rotor flux space vector being provided as the reference space vector;

normalizing the stator current model space vector and a real stator current space vector;

comparing the normalized stator current model space vector with the normalized real stator current space vector, and determining a normalized differential current space vector as a function of this comparison;

multiplying the normalized differential current space vector by a first operating-point dependent variable complex factor;

transforming the multiplied normalized differential current space vector into a field-oriented complex reference system by multiplying the multiplied normalized differential current space vector by the conjugated complex reference space vector;

forming a system deviation as a function of an imaginary component of the transformed multiplied normalized differential current space vector; and adjusting the rotor angular velocity using the system deviation as a system parameter so that the system deviation becomes zero.

11. The method according to claim 10, further comprising the steps of:

forming a normalized time integral value of the normalized differential current space vector;

multiplying the normalized time integral value of the normalized differential current space vector by a second operating-point-dependent variable complex factor to form a processed differential current integral space vector;

adding the processed differential current integral space vector to the transformed multiplied normalized differential current space vector; and determining the second operating-point-dependent variable complex factor according the following equation:

$$\underline{K}_I = \hat{\rho} \cdot (\hat{\sigma} + j \cdot \hat{n}_r)$$

where $\underline{K}_I$ is the second operating-point-dependent variable complex factor, $\hat{\rho}$ is a ratio of a rotor time constant of the polyphase machine to a stator time constant of the polyphase machine, $\hat{\sigma}$ is a leakage factor of the polyphase machine, $\hat{n}_r$ is the normalized angular velocity of the normalized rotor flux space vector in the rotor-fixed reference system.

12. A method according to claim 11, further comprising the step of:

determining, for processing the normalized differential current space vector and the normalized time integral value of the normalized differential current space vector, the first operating-point-dependent variable complex factor and the second operating-point-dependent variable complex factor, according to the following equations:

$$\underline{K}_\omega = \hat{\rho} + 1 + j \cdot \hat{n}_r$$

and $$\underline{K}_I = \hat{\rho} \cdot (\hat{\sigma} - j \cdot \hat{n})$$

where $$\hat{n} = \hat{\omega}/\omega^*$$

with $\underline{K}_\omega$ being the first operating-point-dependent complex variable factor, $\hat{n}$ being a normalized difference between the angular velocity of the normalized rotor flux space vector in the rotor-fixed reference system and in the stator-fixed reference system, $\hat{\omega}$ being a model value of the angular velocity of the rotor of the polyphase machine, and $\omega^*$ being a reference value of the angular velocity of the rotor of the polyphase machine.

13. A method of determining a rotor angular velocity of a polyphase machine operated by field orientation without a transmitter, comprising the steps of:

determining power converter control signals, a stator current model space vector and a conjugated complex reference space vector as a function of a flux setpoint, a d.c. voltage value applied at an input of a pulse power converter of the polyphase machine, measured power converter output voltage values, and system parameters, the conjugated complex reference space vector formed from a reference space vector, a normalized rotor flux space vector divided by a square of the normalized rotor flux space vector being provided as the reference space vector;

normalizing the stator current model space vector and a real stator current space vector;

comparing the normalized stator current model space vector with the normalized real stator current space vector, and determining a normalized differential current space vector as a function of this comparison;

transforming the normalized differential current space vector into a field-oriented complex reference system by multiplying the normalized differential current space vector by the conjugated complex reference space vector;

multiplying a negative imaginary stator frequency by an additional space vector to form a first product;

multiplying the negative imaginary stator frequency by a time integral of the additional space vector to form a second product, the additional space vector being a sum of the transformed normalized differential current space vector and the second product;

adding the first product to a time derivative of the transformed normalized differential current space vector to form a sum space vector;

multiplying the additional space vector by a first operating-point-dependent variable complex factor to form a third product;

multiplying the time integral of the additional space vector by a second operating point dependent variable complex factor to form a fourth product;

adding the third product, the fourth product and the sum space vector to form a superimposed space vector;

forming a system deviation as a function of an imaginary component of the superimposed space vector; and adjusting the rotor angular velocity using the system deviation as a system parameter so that the system deviation becomes zero.

14. The method according to claim 13, further comprising the steps of:

before the transforming step, multiplying the stator current model space vector and the real stator current space vector by a third operating-point-dependent complex variable factor;

comparing real components of the transformed multiplied stator current model space vector with one another, and determining a second system deviation as a function of this comparison; and adjusting a stator resistance using the second system deviation as a second system parameter so that the second system deviation becomes zero.

15. The method according to claim 14, further comprising the step of:

multiplying the second system deviation by a sign.

16. The method according to claim 13, further comprising the step of:

determining the additional space vector according to the following equation:

$$\underline{u} = \left( \Delta \underline{y}_s \cdot \hat{\underline{\Psi}}_r^* / |\hat{\underline{\Psi}}_r|^2 \right) - j \cdot \hat{n}_s \cdot \left[ \int \underline{u} \cdot d\tau \right]$$

where $\underline{u}$ is the additional space vector, $\Delta \underline{y}_s$ is the normalized differential current space vector, $\hat{\underline{\Psi}}_r$ is the normalized rotor flux space vector, and $\hat{n}_s$ is the stator frequency.

17. The method according to claim 13, further comprising the step of:

determining the sum space vector according to the following equation:

$$\vec{u} = d\left(\Delta \vec{y_s} \cdot \vec{\Psi}_r^* / |\vec{\Psi}_r|^2\right) / d\tau - j \cdot \hat{n}_s \cdot \vec{u}$$

where $\vec{u}$ is the sum space vector, $\vec{u}$ is the additional space vector, $\Delta \vec{y_s}$ is the normalized differential current space vector, $\vec{\Psi}_r$ is a normalized rotor flux space vector, and $\hat{n}_s$ is the stator frequency.

18. The method according to claim 13, further comprising the step of:

determining the time integral formed of the additional space vector using the following equation:

$$\left[\int \vec{u} \cdot d\tau\right] = \left\{\int \Delta \vec{y_s} \cdot d\tau\right\} \cdot \vec{\Psi}_r^* / |\vec{\Psi}_r|^2$$

where $\vec{u}$ is the addition space vector, $\Delta \vec{y_s}$ is the normalized differential current space vector and $\vec{\Psi}_r$ is the normalized rotor flux space vector.

19. The method according to claim 13, further comprising the step of:

determining the first operating-point-dependent variable complex factor according to the following equation:

$$\underline{K}_\omega = \hat{\rho} + 1 + j \cdot (\hat{n}_s + \hat{n}_r)$$

with $\underline{K}_\omega$ being the first operating-point-dependent variable complex factor, $\hat{\rho}$ being a ratio of a rotor time constant of the polyphase machine to a stator time constant of the polyphase machine, $\hat{n}_s$ being the normalized angular velocity of the normalized rotor flux space vector in a stator-fixed reference system, and $\hat{n}_r$ being the normalized angular velocity of the normalized rotor flux space vector in a rotor-fixed reference system.

20. A method according to claim 13, further comprising the step of:

determining the second operating-point-dependent variable complex factor according to the following equation:

$$\underline{K}_I = \hat{\rho} \cdot \hat{\sigma} - \hat{n}_s \cdot \hat{n}_r + j \cdot (\hat{n}_s + \hat{\rho} \cdot \hat{n}_r) = Z$$

with $\underline{K}_I$ being the second operating-point-dependent variable complex factor, $\hat{\rho}$ being a ratio of a rotor time constant of the polyphase machine to a stator time constant of the polyphase machine, $\hat{\sigma}$ being a leakage factor of the polyphase machine, $\hat{n}_s$ being the normalized angular velocity of the normalized rotor flux space vector in a stator-fixed reference system, and $\hat{n}_r$ being the normalized angular velocity of the normalized rotor flux space vector in the rotor-fixed reference system.

21. The method according to claim 13, further comprising the steps of:

multiplying the normalized differential current space vector by a third operating-point-dependent variable complex factor; and after the transforming step, forming a second system deviation as a function of a real component of the transformed normalized differential current space vector.

22. The method according to claim 13, further comprising the step of:

determining the second operating-point-dependent variable complex factor has an additional operating point variable complex factor according to the following equation:

$$\underline{K}_R = -j \cdot Z$$

where $$Z = \hat{\rho} \cdot \hat{\sigma} - \hat{n}_s \cdot \hat{n}_r + j \cdot (\hat{n}_s + \hat{\rho} \cdot \hat{n}_r)$$

with $\underline{K}_R$ being the second operating-point-dependent variable complex factor, $\hat{\rho}$ being a ratio of a rotor time constant of the polyphase machine to a stator time constant of the polyphase machine, $\hat{\sigma}$ being a leakage factor of the polyphase machine, $\hat{n}_s$ being a normalized angular velocity of the normalized rotor flux space vector in a stator-fixed reference system, and $\hat{n}_r$ being a normalized angular velocity of the normalized rotor flux space vector in a rotor-fixed reference system.

23. The method according to claim 13, further comprising the step of:

forming a second system deviation by multiplying by a real factor formed from a real component of the superimposed space vector that is generated to form a fifth product, multiplying the fifth product by a real isolation factor to form a sixth product, and adding the sixth product to the imaginary component of the superimposed space vector.

24. The method according to claim 23, further comprising the step of:

determining the real factor according to the following equation:

$$\underline{K}R = \hat{n}_s \cdot (1 - \hat{\sigma})^2 / (2 \cdot \hat{\sigma} \cdot \hat{n}_r)$$

where $\underline{KR}$ is the real factor, $\hat{\sigma}$ is a leakage factor of the polyphase machine, $\hat{n}_r$ is a normalized angular velocity of the normalized rotor flux space vector in a rotor-fixed reference system, and $\hat{n}_s$ is a normalized angular velocity of the normalized rotor flux space vector in a stator-fixed reference system.

25. The method according to claim 23, further comprising the step of:

determining the real isolation factor according to the following equation:

$$\underline{KE} = (\hat{\sigma} - \hat{n}_r^2)/[\hat{n}_s \cdot (1-\hat{\sigma})^2]$$

where $\underline{KE}$ is the real isolation factor, $\hat{\sigma}$ is a leakage factor of the polyphase machine, $\hat{n}_r$ is a normalized angular velocity of the normalized rotor flux space vector in a rotor-fixed reference system, and $\hat{n}_s$ is a normalized angular velocity of the normalized rotor flux space vector in a stator-fixed reference system.

26. A method of determining a rotor angular velocity of a polyphase machine operated by field orientation without a transmitter, comprising the steps of:

determining power converter control signals, a stator current model space vector and a conjugated complex reference space vector as a function of a flux setpoint, a d.c. voltage value applied at an input of a pulse power converter of the polyphase machine, measured power converter output voltage values, and system parameters;

normalizing the stator current model space vector and a real stator current space vector;

comparing the normalized stator current model space vector with the normalized real stator current space vector, and determining a normalized differential current space vector as a function of this comparison;

transforming the normalized differential current space vector into a field-oriented complex reference system by multiplying the normalized differential current space vector by the conjugated complex reference space vector;

adding i) a time derivative of the transformed normalized differential current space vector, and ii) the transformed normalized differential current space vector multiplied by a first operating-point-dependent variable complex factor to form a first sum;

multiplying a real component of the first sum by a real factor $\underline{KR}$ to form a first product;

multiplying the first product by a real isolation factor to form a second product;

adding the second product to an imaginary component of the first sum to form a second sum;

adjusting a stator resistance of the polyphase machine using the first product as a first system parameter; and adjusting a normalized rotational speed of the polyphase machine using the second sum as a second system parameter.

27. The method according to claim 26, further comprising the step of:

determining the real factor according to the following formula:

$$\underline{KR} = \hat{n}_s \cdot (1-\hat{\sigma})^2/(2 \cdot \hat{\sigma} \cdot \hat{n}_r)$$

where $\underline{KR}$ is the real factor, $\hat{\sigma}$ is a leakage factor of the polyphase machine, $\hat{n}_r$ is a normalized angular velocity of a normalized rotor flux space vector in a rotor-fixed reference system, and $\hat{n}_s$ is a normalized angular velocity of the normalized rotor flux space vector in a stator-fixed reference system.

28. The method according to claim 26, further comprising the step of:

determining the real isolation factor $\underline{KE}$ is calculated according to the following equation:

$$\underline{KE} = (\hat{\sigma} - \hat{n}_r^2)/[\hat{n}_s \cdot (1-\hat{\sigma})^2]$$

where $\underline{K}_E$ is the real isolation factor, $\hat{\sigma}$ is a leakage factor of the polyphase machine, $\hat{n}_r$ is a normalized angular velocity of a normalized rotor flux space vector in a rotor-fixed reference system, and $\hat{n}_s$ is a normalized angular velocity of the normalized rotor flux space vector in a stator-fixed reference system.

29. The method according to claim 26, further comprising the step of:

determining the first operating-point-dependent variable complex factor according to the following equation $$\underline{K}_\omega = 1 + \hat{\rho} \cdot \hat{n}_r/\hat{n}_s - j \cdot [\hat{\rho} \cdot \hat{n} \, \sigma/\hat{n}_s - \hat{n}_r]$$

where $\underline{K}_\omega$ is the first operating-point-dependent variable complex factor, $\hat{\rho}$ is a ratio of a rotor time constant of the polyphase machine to a stator time constant of the polyphase machine, $\hat{\sigma}$ is a leakage factor of the polyphase machine, $\hat{n}_r$ is a normalized angular velocity of a normalized rotor flux space vector in the rotor-fixed reference system, and $\hat{n}_s$ is a normalized angular velocity of the normalized rotor flux space vector in a stator-fixed reference system.

30. A device for determining an angular velocity of a rotor of a polyphase machine operated by field orientation without a transmitter, comprising:

a signal processor containing a complete machine model, the signal processor including a control signal device for generating control signals, a first output of the signal processor providing a conjugated complex reference space vector;

a transformation device, and input of the transformation device coupled to the first output of the signal processor;

a current measuring element with a downstream coordinate converter, the current measuring element measuring current of the polyphase machine;

a first equalizing controller, an output of the transformation device being coupled to an input of the first equalizing controller;

a complex factor device connected downstream from the signal processor, the complex factor device calculating a first complex factor and a second complex factor; and a processing device, an output of the current measuring element coupled to a second input of the processing device.

31. The device according to claim 30, wherein the processing device includes at least one setpoint and actual value multiplier, each of first inputs of the at least one setpoint and actual value multiplier forming a signal input, second inputs of the at least one setpoint and actual value multiplier forming a common input coupled to a first output of the complex factor device.

32. The device according to claim 31, wherein the signal input of an actual value multiplier of the at least one setpoint and actual value multiplier is coupled to an output of the coordinate converter of the current measuring element, the signal input of a setpoint multiplier of the at least one setpoint and actual value multiplier is coupled an output of the signal processor at which a stator current model space vector is available, outputs of the at least one setpoint and actual value multiplier are each connected to a first input of the transformation device, and the output of the transformation device is coupled via a first comparator to the input of the first equalizing controller.

33. The device according to claim 31, wherein an output of the coordinate converter and a second output of the signal processor at which a stator current model space vector is available are coupled to a comparator device, an output of the comparator device coupled to the signal input of a setpoint multiplier of the at least one setpoint and actual value multiplier.

34. The device according to claim 33, wherein an output of the comparator device is coupled an input of an integrator, an output of the integrator coupled to an adder by an additional multiplier, a first input of the adder is coupled to an output of a setpoint multiplier of the at least one setpoint and actual value multiplier, an output of the adder is coupled to a signal input of an additional multiplier, a second input of the additional multiplier is coupled to the first output of the complex factor device.

35. The device according to claim 34, wherein the output of the comparator device is coupled to a differentiator, an output of the differentiator being coupled to an additional input of the adder.

36. The device according to claim 33, wherein the output of the comparator device is coupled to a first input of an additional multiplier, a second input of the additional multiplier is coupled to the first output of the signal processor at which the conjugated complex reference space vector is available, an output of the additional multiplier is coupled to an additional adder and to a differentiator, an output of the differentiator being coupled an input of a second additional adder, a third output of the signal processor at which a negative imaginary stator frequency is available is coupled to a first input of each of two further multipliers, a second input of a first one of the two further multipliers being coupled to the output of the additional adder and the output of the first one of the two further multipliers being coupled to the second additional adder, an output of the additional adder being coupled to an input of an integrator and to a first input of the setpoint multiplier of the at least one setpoint and actual value multiplier, an output of the integrator being coupled to a second input of a second one of the two further multipliers and to a first input of a second further multiplier, a second input of the second further multiplier being coupled to a second output of the complex factor device at which a third complex factor is available, and outputs of the second further multiplier, the setpoint multiplier of the at least one setpoint and actual value multiplier, and the additional adder are connected to inputs of the second additional adder, an output of the second additional adder is coupled to the first equalizing controller.

37. The device according to claim 36, wherein a first output of the second additional adder is coupled to a first input of a third further multiplier, a second input of the third further multiplier being coupled to third output of the complex factor device at which a real factor is available, an output of the third further multiplier being coupled to a first input of a fourth further multiplier and to a second equalizing controller, a second input of the fourth further multiplier being coupled to a fourth output of the complex factor device at which a real isolation factor is available, an output of the fourth further multiplier coupled to the second additional adder.

38. The device according to claim 33, wherein an output of the comparator device is coupled to a first input of a first additional multiplier, a second input of the first additional multiplier is coupled to the first output of the signal processor at which the conjugated complex reference space vector is available, an output of the first additional multiplier is coupled to a differentiator and to the setpoint multiplier of the at least one setpoint and actual value multiplier, outputs of the differentiator and the setpoint multiplier of the at least one setpoint and actual value multiplier is coupled to a first adder, a second input of the setpoint multiplier of the at least one setpoint and actual value multiplier being coupled to the first output of the complex factor device, a first output of the first adder is coupled to a first input of a second additional multiplier, a second input of the second additional multiplier is coupled to a second output of the complex factor device at which a real factor is available, an output of the second additional multiplier is coupled to a first input of a third additional multiplier and to the second equalizing controller, a second input of the third additional multiplier is coupled to a third output of the complex factor device at which a real isolation factor is available, and an output of the third additional multiplier is coupled to a second adder.

39. The device according to claim 31, wherein an output of the coordinate converter is coupled to the signal input of a second actual value multiplier of the at least one setpoint and actual value multiplier, an output of the second actual value multiplier is coupled to a signal input of a second additional multiplier, a second output of the signal processor at which a stator current model space vector is available is coupled to a second setpoint multiplier of the at least one setpoint and actual value multiplier, an output of the second setpoint multiplier is coupled to the signal input of a first additional multiplier, the first output of the complex factor device is coupled to the second inputs of at least one setpoint and actual value multiplier, the first output of the signal processor at which the conjugated complex reference space vector is available is coupled to second inputs of the first additional multiplier and the second additional multiplier, outputs of the first additional multiplier and the second additional multiplier are coupled to a second comparator, an output of the second comparator coupled to an additional parameter input of the signal processor by a second equalizing controller.

40. The device according to claim 30, wherein the processing device includes a setpoint multiplier, a first input of the setpoint multiplier forming a signal input and a second input of the setpoint multiplier coupled to the first output of the complex factor device.

41. The device according to claim 30, wherein the transformation device includes at least two multipliers, second inputs of the at least two multiplier forming a common second input of the transformation device.

42. The device according to claim 41, wherein a second output of the transformation device at which a system deviation is coupled via a second equalizing controller to an additional parameter input of the signal processor.

43. The device according to claim 42, further comprising a first additional multiplier connected upstream from the second equalizing controller, a second input of the first additional multiplier being coupled to a second output of the signal processor at which a sign signal is available.

44. The method according to claim 11, further comprising the steps of:

forming a normalized time derivative of the normalized differential current space vector;

determining the first operating-point-dependent variable complex factor and the second operating-point-dependent factor for processing the normalized differential current space vector and the normalized time integral value of the normalized differential space vector according to the following equations:

$$\underline{K}_\omega = \hat{\rho} + 1 - j \cdot \hat{n}$$

and $$\underline{K}_I = \hat{\rho} \cdot (\hat{\sigma} - j \cdot \hat{n})$$

where $$\hat{n} = \hat{\omega}/\omega_*$$

with $\hat{n}$ being a normalized difference between the angular velocity of the normalized rotor flux space vector in the stator-fixed reference system and in the rotor-fixed reference system, $\hat{\omega}$ being a model value of the angular velocity of the rotor of the polyphase machine, and $\omega_*$ being a reference value of the angular velocity of the rotor of the polyphase machine.

* * * * *